J. B. Mayer.

Clock.

No. 3,606. Reissued Aug. 17, 1869.

Witnesses:
Casper A. Kuster
B. H. Muehle

Inventor:
J. B. Mayer.

United States Patent Office.

JOHN B. MAYER, OF NIAGARA FALLS, NEW YORK.

*Letters Patent No.* 82,266, *dated September* 15, 1868; *reissue No.* 3,606, *dated August* 17, 1869.

IMPROVEMENT IN CLOCKS.

The Schedule referred to in these Letters Patent and making part of the same.

*To all whom it may concern:*

Be it known that I, JOHN B. MAYER, of Niagara Falls, in the county of Niagara, and State of New York, have invented certain new and useful Improvements in Chronometers or other Time-Pieces; and I do hereby declare that the following is a full, clear, and exact description thereof, reference being had to the accompanying drawings, making a part of this specification, in which—

The nature of this invention relates to an improvement in the construction of chronometers, regulators, town and common clocks, watches, and other time-pieces, by which the same may be operated with less power, but greater accuracy and precision, and at the same time will be cheaper of construction than any now manufactured and in use.

Letters of like name and kind refer to like parts in each of the figures.

Though the improvements herein described are equally applicable to time-pieces of every variety and description, I have represented in the accompanying drawings, as a specimen, an eight-day clock, indicating seconds, minutes, hours, and days, by hands revolving upon a common centre; and in describing the same, I shall confine myself chiefly to the particular parts which constitute my improvements.

A represents a spur-wheel, supported loosely upon a central or main shaft, B, having bearings in the frame-plates C C.

To this main shaft is attached the moving-power of the clock, in this instance a weight upon the end of a cord wound around a drum, which is, in the usual manner, provided with ratchet-wheel and spring-pawl or click, for its proper connection with the wheel A.

The wheel A is provided with three hundred and sixty (360) teeth or cogs, and makes one revolution every hour, on which account, and because the minute-hand may be attached to its shaft, I call this wheel the "minute-wheel."

D represents the escape-wheel, which is supported upon the shaft *d'*, and revolved by means of the pinion E, which has six (6) leaves, and gears with the wheel A.

Hence, as the wheel A makes one revolution per hour, the wheel D must make sixty revolutions per hour, or one per minute, and therefore a hand attached to its shaft will indicate seconds.

The escape-wheel has thirty teeth, so that each movement of the pendulum in either direction causes the second-hand to indicate one second upon the dial-plate.

These two wheels, A and D, and the pinion E, take the place of and fully answer the same purpose as the train of five wheels and four pinions, which comprises the running-gear of clocks of ordinary construction.

The advantages gained by this improvement will be hereinafter set forth.

One end of the shaft B projects beyond the face of the clock, and is squared, so as to fit a key for winding up the clock in a common manner.

F, F', G, and G' represent four spur-wheels, which, by preference, I make of equal size, and each with the same number of teeth, but the number of these spur-wheels, as well as their diameter and number of teeth, may be varied at pleasure, so long as the same result is thereby attained, that of communicating the precise movement of the shaft B to the place where the minute-hand is to be attached, in this instance, to a cylinder or hollow sleeve upon the shaft *d'*.

Figure 4:
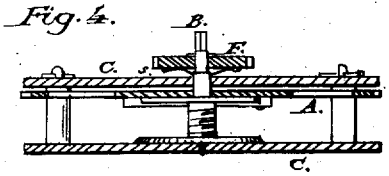
Figure 4 is a horizontal section in the plane indicated by the line *x z*, fig. 2.

The wheel F is loose upon the shaft B, but is revolved with the same by friction, a flat spring, *s*, fig. 4, which is made fast to the shaft, being interposed between the wheel F and a shoulder upon the shaft. A pawl, *h*, is hinged to the frame-plate, its free end resting lightly, by its own gravitation, or by a spring, if necessary, upon the circumference of the wheel F, and engaging with the teeth thereof, in such manner, that whenever the shaft B is turned in a direction opposite to the forward movement of the clock-work, the wheel F, (and with it the whole running-gear connected therewith,) remains stationary. Hence, the clock may be wound up without the hands being carried backward.

A ratchet-wheel may be used independent or in the place of the wheel F, without departing from the principle of this part of my improvement.

The hour-hand is fastened to a larger cylinder or sleeve, fitting over and revolving independently around the first, and is revolved by means of a spur-wheel, I, gearing with a pinion connected to the wheel G'.

Figure 1:
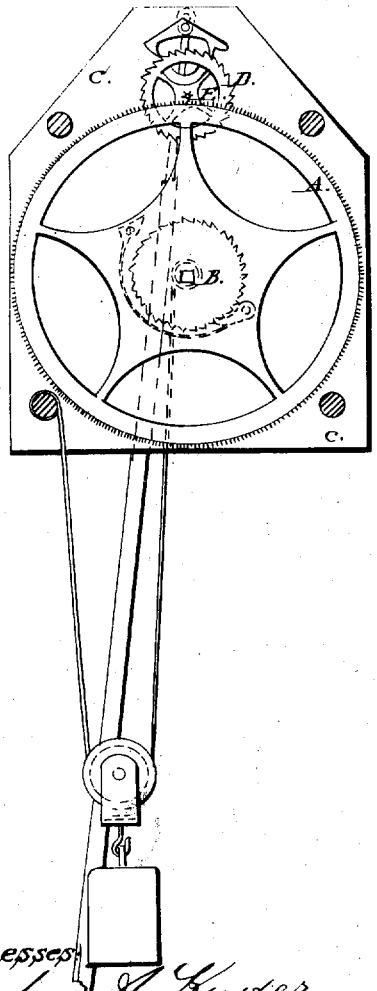
Figure 1 is a vertical section.
Figure 2:
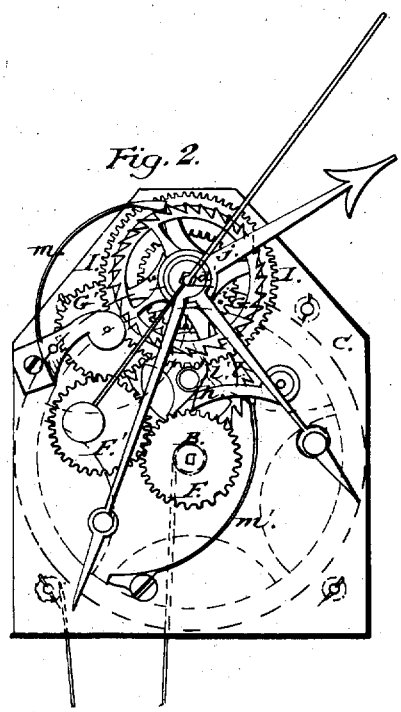
Figure 2 is a front elevation.
Figure 3:
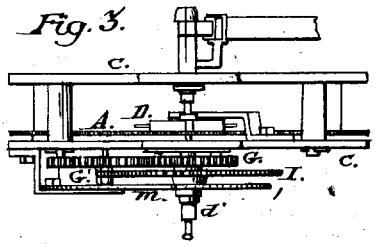
Figure 3 is a top plan view.

The hand which indicates the days of the month is shown at *j*, and operated by means of the ratchet-wheels *k* and *l*, the revolving tooth *l'*, and a pin, *i*, fig. 3, upon the side of the wheel G, engaging once during every revolution of that wheel with the ratchet-wheel *l*, the movements of all these parts being regulated and controlled by the action of the springs *m* and *m'*. Other hands for indicating the days of the week and month may be added in the usual way.

The advantages of the improvements hereinabove described will be readily understood by those who are acquainted with horology, and may be briefly stated as follows:

First, by the reduction of the number of spur-wheels and pinions usually composing the running-gear of clocks, to one spur-wheel, one escape-wheel, and one pinion, and the number of spindles to only two, the friction of the teeth of the wheels and the spindles in their bearings must be reduced in a like proportion; hence, the weight required for setting the same in motion, will be less than now used—an important desideratum for town and other large clocks.

Second, the chief cause of a clock's gaining or losing time, viz, the accumulation of dust in the bearings of the spindles, is almost entirely obviated on account of there being but two spindles, (B and *d'*,) to keep clean and free from dust or other obstructions, instead of four or five.

Third, with the aid of the machinery now used by manufacturers of clocks and other time-pieces, a spur-wheel can be stamped or cut out almost instantly, without regard to its size or number of teeth; hence, the important advantage of this clock over all others, is its cheapness of construction, on account of the reduction in the number of wheels, pinions, and spindles.

What I claim as my invention, and desire to secure by Letters Patent, is—

1. The combination and arrangement of the wheel A, pinion E, and escapement-wheel D, the parts having the characteristics, and operating together in the manner described, and for the purpose set forth.

2. The combination and arrangement of wheel A, pinion E, and escapement-wheel D, with the hour and minute hands upon the axis of said escapement-wheel, substantially as set forth.

3. The combination, with wheel A, pinion E, and escapement-wheel D, of the ratchet-wheels *k l*, revolving-tooth *i'*, pin *i*, and wheel G, substantially as and for the purpose described.

4. The shaft B, carrying the loose wheel F, friction-spring *s*, wheel A, and winding-drum, in connection with pawl *h*, arranged and combined to prevent the carrying back of the hands during the winding of the clock, as set forth.

The above signed by me, this 13th day of March, 1869.

J. B. MAYER.

Witnesses:

H. N. GRIFFITH,

SAMUEL TOMPKINS.